(12) United States Patent
Privalov

(10) Patent No.: US 7,769,204 B2
(45) Date of Patent: Aug. 3, 2010

(54) SMOKE DETECTION METHOD AND APPARATUS

(76) Inventor: George Privalov, 205 E. Joppa Rd., #902, Towson, MD (US) 21286

( * ) Notice: Subject to any disclaimer, the term of this patent is extended or adjusted under 35 U.S.C. 154(b) by 422 days.

(21) Appl. No.: 11/352,721

(22) Filed: Feb. 13, 2006

(65) Prior Publication Data

US 2007/0188336 A1 Aug. 16, 2007

(51) Int. Cl.
- G06K 9/46 (2006.01)
- G06K 9/62 (2006.01)
- G08B 17/10 (2006.01)
- H04N 7/18 (2006.01)
- H04N 9/47 (2006.01)

(52) U.S. Cl. .......... 382/103; 382/107; 382/156; 382/203; 340/628; 348/82; 348/143

(58) Field of Classification Search .......... 382/100, 382/156, 157, 158, 190, 203, 103, 107; 348/82, 348/83, 143; 340/577, 628

See application file for complete search history.

(56) References Cited

U.S. PATENT DOCUMENTS

| | | | |
|---|---|---|---|
| 3,973,852 A | 8/1976 | Moore et al. | 356/207 |
| 4,170,264 A | 10/1979 | Gibson | 169/24 |
| 4,875,526 A | 10/1989 | Latino et al. | 169/24 |
| 5,153,722 A | 10/1992 | Goedeke et al. | 358/108 |
| 5,237,308 A * | 8/1993 | Nakamura | 340/588 |
| 5,719,557 A | 2/1998 | Rattman | 340/628 |
| 5,751,209 A | 5/1998 | Werner | 340/286.05 |
| 5,832,187 A * | 11/1998 | Pedersen et al. | 706/45 |
| 5,838,242 A | 11/1998 | Marsden | 340/628 |
| 5,850,182 A | 12/1998 | Schuler | 340/578 |
| 5,926,280 A | 7/1999 | Yamagishi et al. | 356/390 |
| 5,995,008 A | 11/1999 | King et al. | 340/578 |
| 6,184,792 B1 | 2/2001 | Privalov et al. | 340/578 |

(Continued)

FOREIGN PATENT DOCUMENTS

FR 2696939 A1 * 4/1994

(Continued)

OTHER PUBLICATIONS

Machine Translation of FR 2696939 A1.*

Primary Examiner—Matthew C Bella
Assistant Examiner—Anthony Mackowey
(74) Attorney, Agent, or Firm—Hovey Williams LLP

(57) ABSTRACT

A system for detecting smoke in a monitored area includes: (a) a video device for capturing a series of successive video images of the monitored area as a series of two-dimensional bitmaps having a specified number of pixels, (b) a processing device having memory capability for storing said series of images and processing capability for analyzing the series of images, and (c) an analysis algorithm that runs on the processing device and has: (i) an identification portion for examining this series of bitmaps to identify indicator areas in successive bitmaps of adjacent pixels that have the potential for being used as indicators for the existence of smoke in the monitored area, (ii) a tracking portion for identifying the trends in the growth and movement of the indicator areas, and (iii) a trend comparison portion for comparing the identified trends to determine which of the trends are consistent with those produced by a smoke cloud.

10 Claims, 5 Drawing Sheets

U.S. PATENT DOCUMENTS

| | | |
|---|---|---|
| 6,285,291 B1 | 9/2001 | Knox et al. .................. 340/634 |
| 6,844,818 B2 * | 1/2005 | Grech-Cini ................. 340/628 |
| 6,937,743 B2 * | 8/2005 | Rizzotti et al. .............. 382/100 |
| 6,956,485 B1 * | 10/2005 | Aird et al. ................... 340/577 |
| 7,002,478 B2 * | 2/2006 | Moore et al. ................ 340/577 |
| 2003/0146972 A1 * | 8/2003 | Morander .................... 348/46 |
| 2003/0215143 A1 * | 11/2003 | Zakrzewski et al. ......... 382/190 |
| 2007/0064980 A1 * | 3/2007 | Knox et al. .................. 382/128 |

FOREIGN PATENT DOCUMENTS

WO     WO 9408660 A1 *   4/1994

* cited by examiner

Evolution of a "human" cluster

SMOKE DETECTION METHOD AND APPARATUS

BACKGROUND OF THE INVENTION

1. Field of the Invention

The present invention generally relates to electrical, condition responsive systems and methods. More particularly, this invention relates to a method and apparatus for detecting and identifying developing smoke clouds in a monitored area using a sequence of digitized images.

2. Description of the Related Art

Smoke detectors are very important safety devices that can provide an early warning of fire in a monitored area. Considerable efforts have been devoted to improving upon the technology used in smoke detectors as a means of increasing their usefulness and reliability.

One of the and most commonly used methodologies for smoke detectors involves measuring the presence of aerosol particles at the location of a smoke detector's sensor. Such measurements are based either on light scattering phenomena or on the effects due to smoke particle interactions with an ionization current created within the detector. See Rattman, et al., U.S. Pat. No. 5,719,557.

A disadvantage of this approach is that its measurements are limited in terms of their sensing area since such detectors monitor for the presence of smoke only at those points that are in close proximity to the location of the detector's sensor. The successful detection of smoke in a monitored area using this technique greatly depends upon the rate of movement of smoke particles toward the detector's sensor which, depending upon the size of the monitored area, can be located at considerable distance from the initial source of any smoke.

To address this insufficient sample size problem, it has been suggested that air samples be collected at multiple locations in the monitored area and then to guide these samples to the location of the detector's sensor. See Knox, et al., U.S. Pat. No. 6,285,291. Although effectively increasing the extent of spatial sampling within a monitored area, this method has the disadvantage of requiring the installation of multiple sampling tubes at assorted locations throughout the monitored area.

Another approach for smoke detection has been to monitor the light scattering effect of smoke particles on a laser beam that is directed across a monitored area. Rather than sensing smoke in the relatively small vicinity of a single sensor, the laser beam approach effectively senses for smoke along a line that can be extended for a considerable distance throughout the monitored area. See Moore, et al., U.S. Pat. No. 3,973,852. However, a disadvantage of using such a laser beam approach is that, although it may effectively measure smoke conditions at more points within a monitored area that just those points in the vicinity of a single sensor, it still does not provided feedback on the smoke conditions at all or most of the points within the monitored area.

In recent years, multiple practitioners have introduced yet another approach for detecting smoke. Instead of directly measuring the attenuation or scattering of light at the given point in space, their approach uses a digital image that is produced by a TV and identifies the presence of smoke in the viewed area by the effects of the smoke on the video image.

In Grech-Cini's U.S. Pat. No. 6,844,818, each pixel of the image is constantly analyzed statistically against the average parameters across the image. The characteristics that are monitored include brightness, color intensity and spatial contrast. Based on the statistical averages, a Bayesian estimator is produced for each pixel and is compared to values from the current image. Once a significant deviation from the estimate occurs over a range of pixels, a determination is made on whether the anomaly is caused by smoke. The disadvantage of this approach is that it has been found to yield a high rate of false alarms that may be caused by changes in the viewed area's lighting conditions or the occurrence of moving objects in the area.

In Rizzotti at al.'s U.S. Pat. No. 6,937,743, a sequence of images are analyzed to identify changes in the contrast of the image by measuring the attenuation of spatial high frequencies using FFT or FHT. Meanwhile, other practitioners (e.g., see Toreyin et al., MUSCLE, Malaga, 4-5 Nov. 2004) have used a wavelet transform for detecting the of loss in clarity occurring across a sequence of images.

However, it would appear that this entire approach of identifying a image's deterioration of contrast, loss of edges or clarity has fundamental drawbacks. First, its use requires that the content of the image have high contrast with enough details. Second, it is based on an assumption that smoke will be semi-transparent and will gradually attenuate the fine details of the image. In reality, this assumption is found to be valid in only limited cases. For example, it has been observed that thick smoke, at good illumination conditions and with plain background, can actually increase the high frequency content of an image.

The present inventor has disclosed yet another alternative approach in U.S. Publication No. 2005/0100193, where the light sources within the image are analyzed to detect the smoke-induced effects on diffusion and scattering in the vicinity of these sources. Practical as a supplementary technique, the disadvantage of this approach is its requirement for a permanent light source within the video image and its ability to detect smoke only when smoke particles are in the vicinity of a light source.

Similarly, Rattman's U.S. Pat. No. 4,614,968 suggests using strategically placed multi-contrast markers for an imaging system that provides close-up views of these objects with high contrast and edge contents. However, this approach limits the area of detection to direct lines of sight with the viewed markers.

Despite the considerable prior art relating to smoke detectors, there is still a need for smoke detector methods and systems that can more effectively measure smoke conditions throughout the entire volume of a desired monitored area.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

It is an object of the present invention to provide apparatus and methods that are effective at detecting smoke within the entire volume of a monitored area.

It is another object of the present invention to provide apparatus and methods that are effective at detecting smoke in industrial petrochemical installations.

It is an object of the present invention to provide apparatus and methods that can operate within the framework of the ordinary Closed Circuit Television (CCTV) surveillance systems that are used to monitor commercial, outdoor, industrial and residential areas.

It is yet another object of the present invention to demonstrate how existing security surveillance equipment may be combined into unique systems which provide the best means to address the detection of smoke in the industrial, commercial and residential installations.

It is a further object of the present invention to provide a means for notification of smoky conditions within a monitored area to remote operators who are using closed circuit television to monitor the area.

These and other objects and advantages of the present invention will become readily apparent as the invention is better understood by reference to the accompanying summary, drawings and the detailed description that follows.

SUMMARY OF THE INVENTION

Recognizing the need for the development of improved smoke detection systems and methods, the present invention is generally directed to satisfying the needs set forth above and overcoming the disadvantages identified with prior art devices and methods.

In accordance with a first embodiment of the present invention, the foregoing need can be satisfied by providing an apparatus for detecting smoke in a monitored area that includes: (a) a means for capturing a series of successive video images of the monitored area as a series of two-dimensional bitmaps having a specified number of pixels, (b) a means for examining this series of bitmaps to identify areas in successive bitmaps of adjacent pixels that have the potential for being used as indicators for the existence of smoke in the monitored area, (c) a means for storing these identified areas from the bitmaps, and (d) a means for analyzing the identified areas so as to identify the temporal changes in these areas which are indicative of the presence of smoke.

Alternative embodiments of the present invention can be obtained by adding to this first embodiment any combination of the following elements: (e) a means for analytically characterizing the data contained in each of the identified areas such that the amount of this data is reduced and specifiable information pertaining to these identified areas is preserved so as to allow one to analyze this reduced data to identify the presence of smoke in the monitored area, and (f) a means for generating an alarm when the means for analyzing the identified areas identifies the temporal changes that are indicative of the presence of smoke.

Still further embodiments of the present invention can be obtained by configuring these means as follows: (g) the means for examining so that it selects those pixels having an approximate uniform change in intensity, (h) the means for analyzing so that it selects those temporal changes chosen from the group consisting of those temporal changes which indicate an ever-increasing number of pixels in those identified areas of the cluster or those temporal changes which indicate that the increase in the size of the identified areas occurs to a greater extent in the top rather than the bottom part of the identified areas, or (i) the means for analyzing so that it makes use of a neural network.

DESCRIPTION OF THE PREFERRED EMBODIMENT

Figure 1:
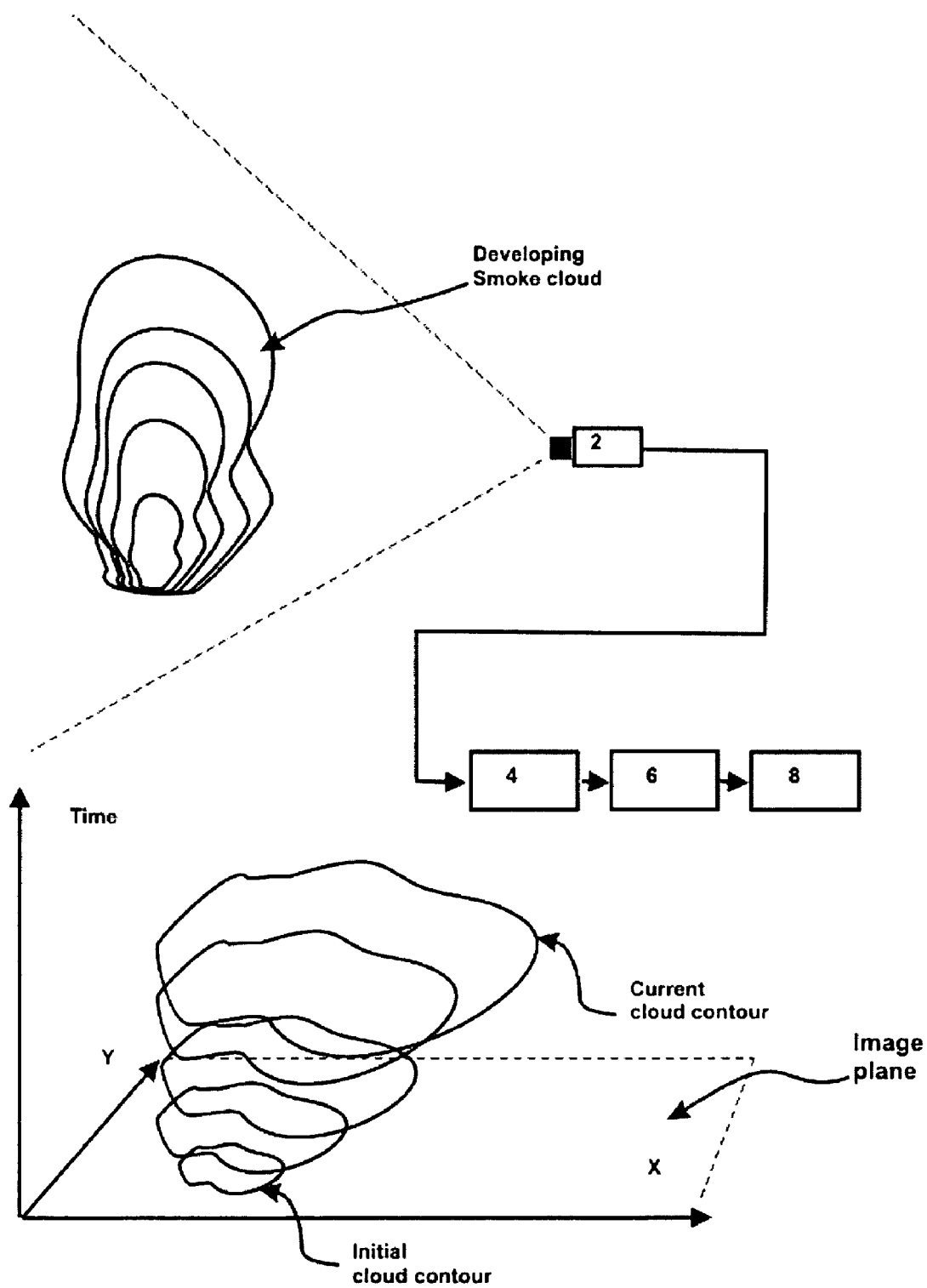
FIG. 1 shows a block diagram of a preferred embodiment of the smoke detection method and apparatus of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1 shows a block diagram of a preferred embodiment of the present invention. The images of a growing smoke cloud within a specified area are seen to be monitored by a camera 2 that converts the image into a digital representation within the computer memory of a video capturing device 4. This representation takes the form of sequence of digital images which are analyzed by a computer system 6.

Figure 2:
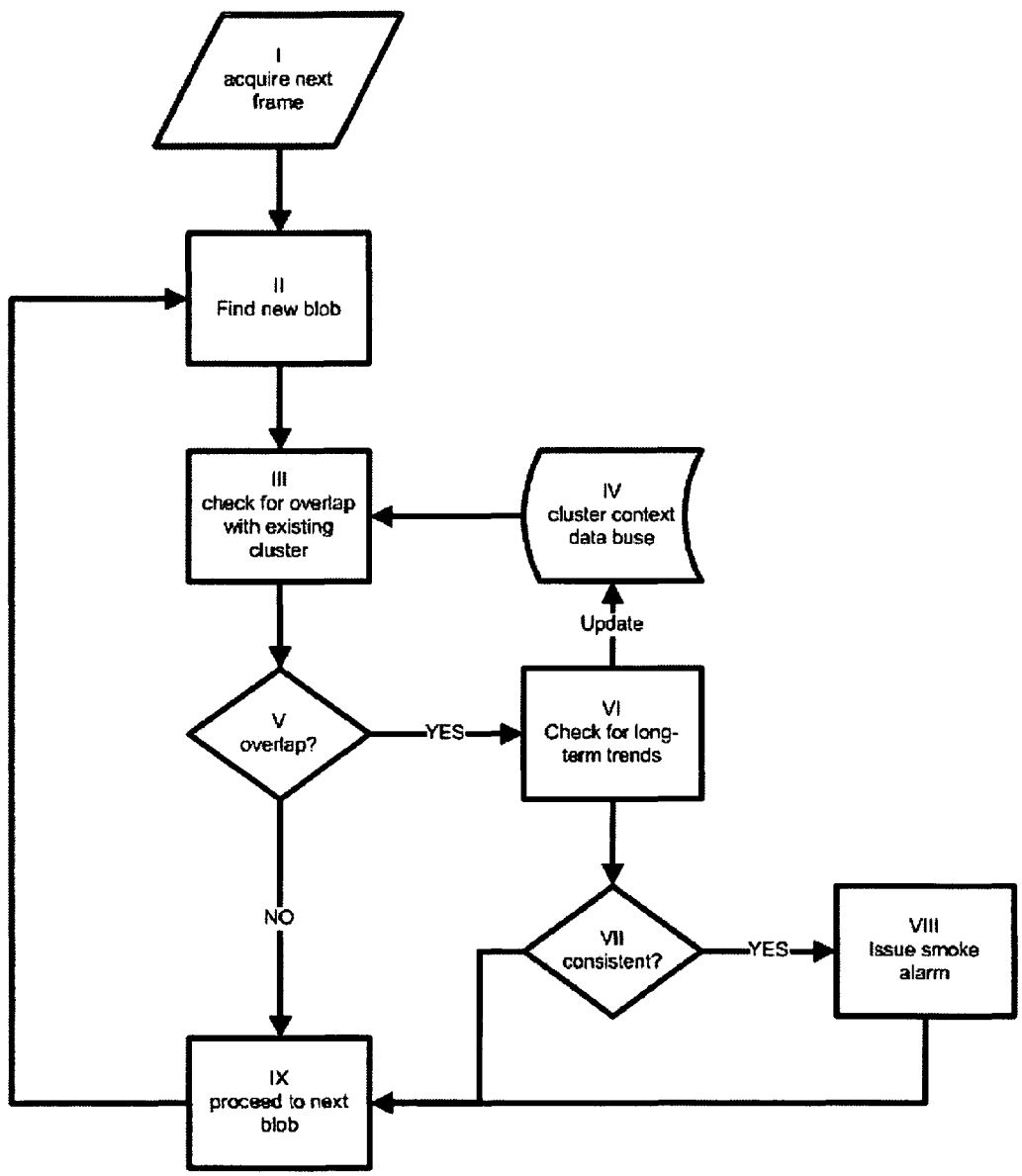
FIG. 2 shows the algorithm of a preferred embodiment of the smoke detection method and apparatus of the present invention.

FIG. 2 illustrates the steps or portions of the present invention's typical analysis algorithms that are used to analyze these images. This analysis algorithm consists of: (a) the identification and extraction of the pixel areas (blobs) that are candidates for being representative of smoke clouds (i.e., these blobs have the potential for being used as indicators of smoke in the monitored area), (b) the tracking of these blobs to identify their long term trends, and (c) comparing these trends to identify those which are consistent with those produced by a growing smoke cloud (i.e., thermal convection). When such identification is made, a prescribed response system 8 is activated.

In every image within a received sequence, the computer system 6 identifies a group of pixels (i.e., blob) that may represent a cloud of smoke by monitoring the changes in the properties of the pixels that comprise the group. Such changes may include, but are not limited to, consistent (across the blob) changes in brightness or intensity. For example, in a simplest case, a cloud of black smoke will make all the pixels within the cloud darker, while white smoke will make all the pixels lighter.

If any portion of a blob is spatially overlapping with the blob(s) from the previous image, such blobs are arranged in a tracking cluster that stores all the sequence of overlapping blobs from a series of consecutive frames (i.e., a cluster is only the set of overlapping regions or blobs of the bitmaps; not the entire bitmaps themselves). From my studies of the temporal changes occurring in such tracking clusters, I have discovered that those of such clusters which are caused by growing smoke clouds exhibit consistent, identifiable signatures in their growth and movement.

Using the present invention's discovery that the tracking clusters for various types of physical phenomena of interest (e.g., a smoke cloud) exhibit consistent, identifiable signatures in their growth and movement, one is able to develop an analysis algorithm for analyzing such captured images so as to identify the occurrence of such phenomena of interest.

Step I of FIG. 2 depicts acquiring a next frame or image. The analysis scheme of the present invention then involves the identification of a blob of interest, as depicted in step II. At its simplest form, this step could be achieved by, for example, searching a captured digital image for a group of pixels with consistent brightness changes.

Once such a blob has been identified, the analysis scheme checks as to whether this new image's blob should be chronologically associated, on the basis of the likelihood of the existence of smoke in the monitored area, with any of the blobs that are being tracked from earlier images. This is achieved by checking for spatial overlap between this new blob and the database of tracking clusters identified from the prior images, as depicted in steps III and V. In case of such overlap, the blob is appended to the appropriate tracking cluster, as depicted in steps IV and VI. If no such overlap exists, this blob becomes the first of what may be a sequence of blobs that will make up yet another cluster. Clusters that have no new blobs added to them are assumed to no longer be active and are purged from the database.

Each updated tracking cluster is analyzed to identify whether the addition of this new blob allows one to identify in such clusters any of the special patterns or signatures of growth or movement that can be associated with a particular type of physical phenomena (e.g., growth and movement of a smoke cloud), as depicted in steps VI and VII. When such a signature has been positively identified, a prescribed system response can be activated, as depicted in step VIII. Meanwhile, as depicted in step IX, this analysis scheme proceeds to analyze the next blob.

Figure 3:
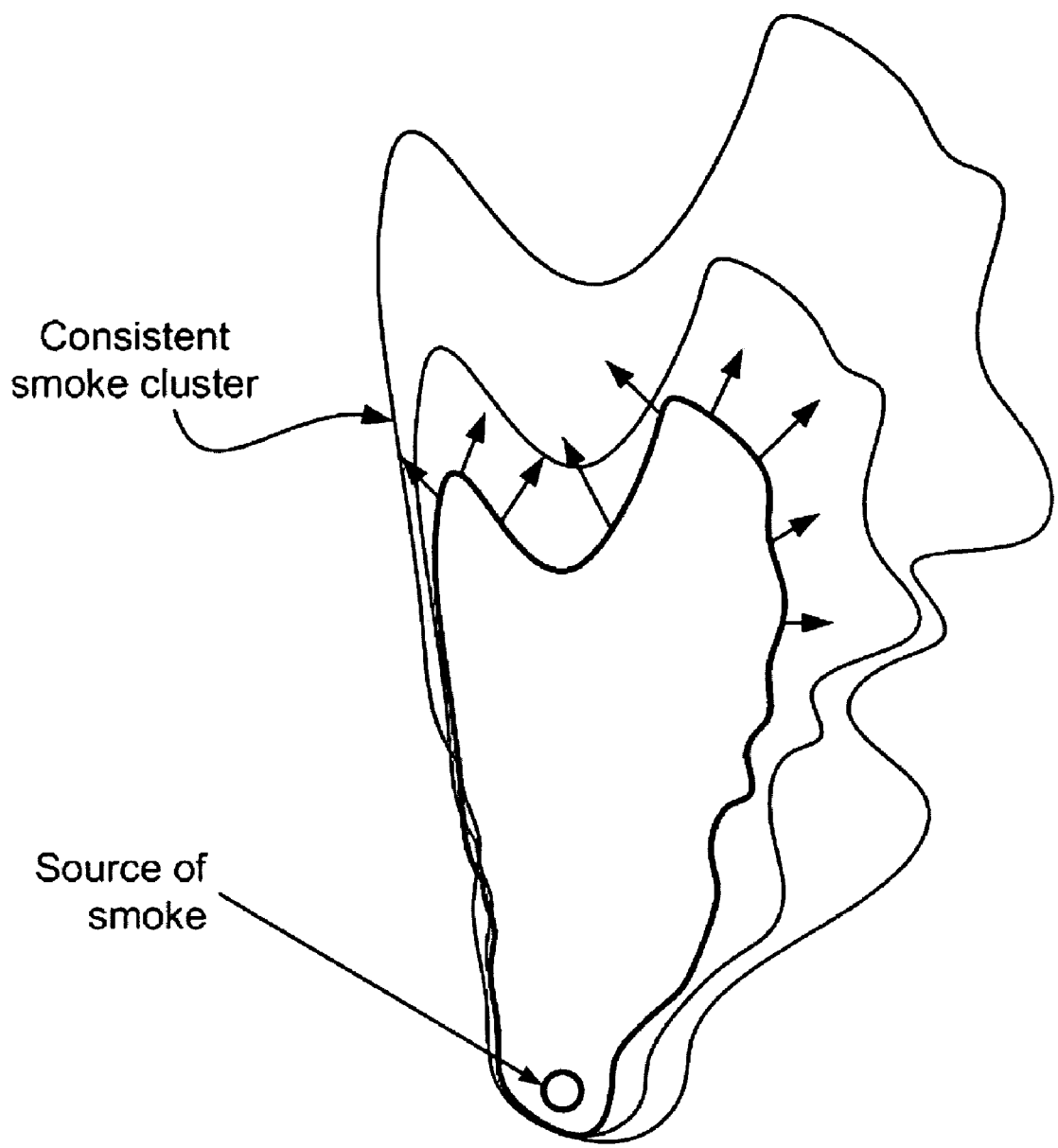
FIG. 3 illustrates the particular trends that are typical for a growing smoke plume.

A representative example of the identifiable signatures in the growth and movement of the blobs within the clusters for growing smoke clouds is shown in FIG. 3. The contours of the blobs from consecutive video frames 1, 2 and 3 are seen to have spatial overlay.

The changes in the growth, movement or shape of representative smoke cloud blobs can be caused by several factors, including: (a) constant supply of smoke from a source, (b) diffusion of the smoke, and (c) air movements within the monitored space. Examples of the blob movements or size changes that can be used to identify such smoke clouds include: (i) blob boundary expansions as more smoke is generated, (ii) blob boundary movement and expansion towards the top of the blob due to the hotter gases that comprise the smoke cloud rising in the surrounding, cooler ambient air (i.e., thermal convection phenomena), and (iii) some area of blob overlay between consecutive images.

Figure 4:
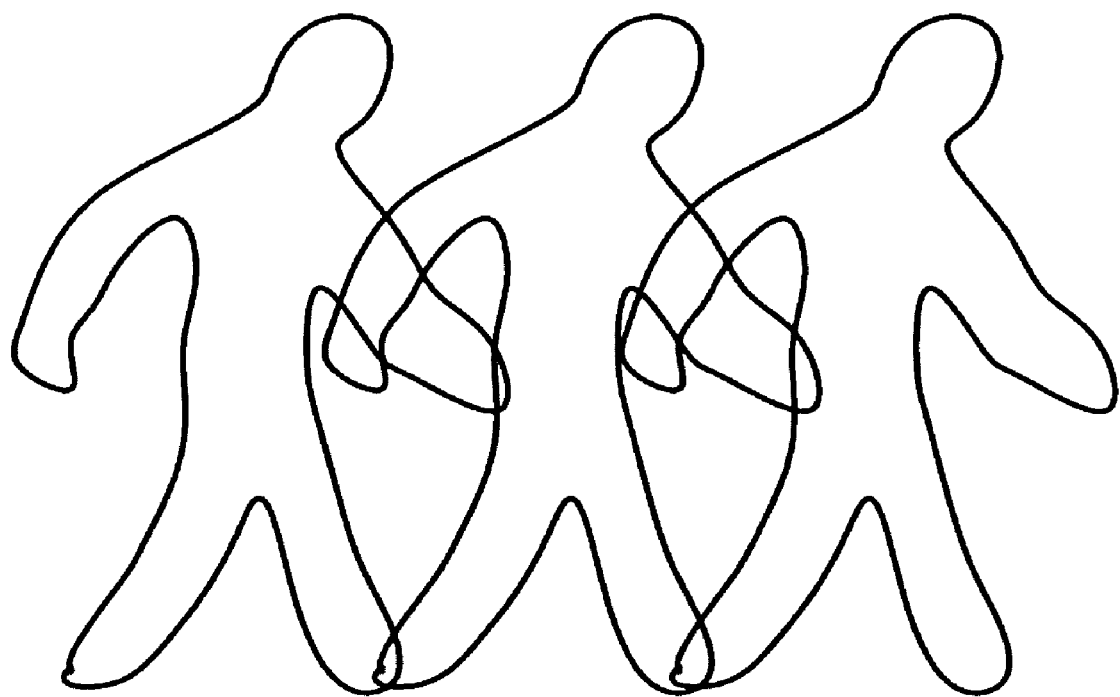
FIG. 4 illustrates the specific trends that are typical for a walking human.

Such blob movements can be easily distinguished from those of other types of physical phenomena or the movements of various types of objects within the view of a camera that captures a temporal record of their digital images. For example, FIG. 4 shows the evolution of the blob that is caused by a human moving across the field of view of a camera.

Technical barriers to the implementation of various embodiments of the present invention include the need to accommodate for the "fuzziness" which is usually seen in actual video data. One means of addressing this problem is the use of a feed-forward, three layer, neural network (those knowledgeable in such technology will recognize that similar results may be achieved by utilizing different neural network layouts). Meanwhile, the magnitude of necessary calculations and the complexity of the underlying network can be simplified by scaling the entire rectangular area of an image tracking cluster into fixed-size pattern of size, for example, 12×12.

Figure 5:
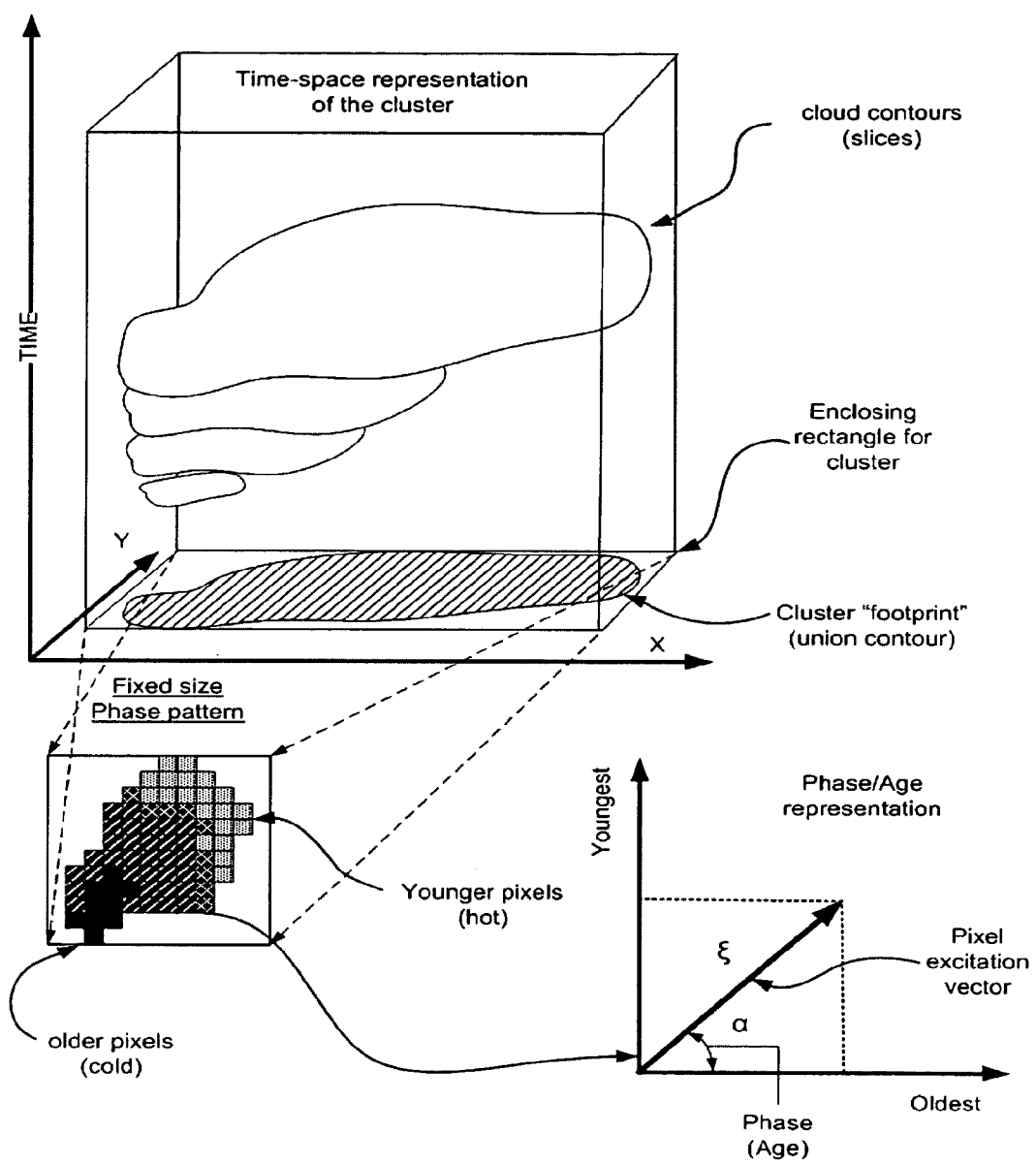
FIG. 5 shows a possible conversion of the growing plume into a 2-D pattern.

For illustrative purposes, it proves useful to show one of the conceivably many possible data reduction schemes that can be used by the present invention for expressing the information pertaining to a typical smoke cluster in a form that will make the further analysis of such data more tractable in terms of allowing one to more easily and with fewer numerical computations identify in such data the signatures or trends that are indicative of smoke in a monitored area. FIG. 5 shows a three dimensional (time plus a two dimensional plane) space for the representation and analysis of such clusters. The vertical axis of this space is defined to be the time since a desired sequence of video images began to be accumulated, while its horizontal, X-Y, plane represents the spatial extent of a video image.

At any given instant, the digital image of a smoke cloud is assumed to be a solid, two dimensional figure (i.e., it has no interior voids; it has a continuous enclosing contour or boundary) such as those represented by one of the slices that are stacked one above another in the temporal plane of FIG. 5. The lateral extent of these slices is seen to be increasing in time (i.e., the sizes of the images taken at instants that are a considerable time after the initiation of the smoke cloud are larger than those taken when the smoke cloud had just begun to form).

In the lower, left-hand side of FIG. 5 is shown a two-dimensional, normalized (12×12) overlay of these slices (i.e., a footprint) in which each cell of this footprint represents the relative (to age of the cluster) time span that the particular cell has been covered by the smoke cloud, and the phase (time of initiation relative to age of the cluster) when the smoke cloud first covered the cell in question.

The analytical representation of the information contained in FIG. 3 can be further simplified, for example, by allowing each cell in this footprint to be represented by a 2-d vector in which the phase, $\alpha$, of this vector is defined so as to provide information on the time when the pixel was "energized" or at what exact moment pixel has been assigned smoke status (e.g., a ranges from 0 to $\pi/2$, with $\pi/2$ being defined as the youngest pixels, or those that have been identified at the greatest time since the initiation of the smoke cloud was recognized). The length, $\xi$, of this 2-d vector may be used to encode, for example, the "age of cell," which is the time duration that it has been covered by the cloud.

In such an analytical representation, the typical smoke cloud yields a cluster that has its longest vector with close to zero phase at the location of the smoke's source, while shorter and similarly higher phased vectors will be at the peripheral locations of the smoke cloud.

Once all necessary information is encoded into a chosen data reduction scheme, it is matter of training of the previously mentioned, neural network to successfully identify the trends and signatures of the various phenomena that are represented in the captured images.

Those familiar with such data analysis techniques should realize that neural networks are by no means the only technique that is available to identify the signatures of various phenomena in such sequences of visual images. Various alternative approaches that are considered to come within the scope of the present invention for the identification of a smoke cloud include: (a) trend analysis of a smoke cloud's contour area (e.g., an ever-increasing number of pixels in those identified areas of a cluster, or the identification of cloud's contour area changes as a positive linear trend over a prescribed period of time with the computed least squares value for said trend being below a prescribed level, or the identification of cloud's contour area changes by a polynomial least square approximation with a consistent positive first derivative exceeding a prescribed value over the a prescribed period and with the least square value being below a prescribed level), (b) movement analysis in the top and bottom segments of a cloud contour (e.g., the increase in the size of the identified areas occurs to a greater extent in the top rather than the bottom part of the identified areas, where the top and bottom parts are defined with respect to the direction of influence of gravity), and (c) various other, logical, rule-based, predicative approaches.

In a preferred embodiment, the present invention is implemented on an Intel® Pentium™ IV class processor platform under a Windows operating system. This processing system is capable of simultaneously handling eight video channels and can also provide the necessary alarm notifications over IP networks.

The algorithms of the present invention have been implemented in C++ programming language using the Microsoft Visual Studio .NET environment. A feed forward, three-layer neural network (294/20/1) configuration is used for pattern matching. Neural network training for smoke cloud identification was done on over 10,000 samples from which more than 95% are nuisances.

In concluding this disclosure, it should be noted that the foregoing is considered as illustrative only of the principles of the present invention. Further, since numerous modifications and changes will readily occur to those skilled in the art, it is not desired to limit the invention to the exact methods described herein, and accordingly, all suitable modifications and equivalents may be resorted to which fall within the scope of the invention as hereinafter forth in the claims to it.

I claim:

1. A system for detecting smoke in a monitored area, said system comprising:
    a means for capturing a series of successive video images of said monitored area in the form of a series of two-dimensional bitmaps having a specified number of pixels,
    a means for examining said series of bitmaps to identify areas in successive bitmaps of adjacent pixels that have the potential for being used as indicators for the existence of smoke in said monitored area,
    a means for chronologically associating said identified areas so as to form clusters that track the direction of at least one of growth and movement of each of said identified areas over the duration of their existences, and
    a means for analyzing the direction of at least one of growth and movement of said clusters of identified areas to identify an increase in the size of said identified areas occurs to a greater extent in a top rather than a bottom part of said identified areas which is indicative of the presence of a growing smoke cloud in said monitored area.

2. The system as recited in claim 1, further comprising: a means for reducing the quantity of the data used to characterize the direction of growth or movement in said identified areas so as to allow one using said system to analyze for the presence of smoke in said monitored area by utilizing fewer numerical computations than would have been required had said quantity of data not been reduced.

3. The system as recited in claim 1, further comprising: a means for generating an alarm when said means for analyzing said identified areas identifies growth or movement indicative of the presence of smoke.

4. The system as recited in claim 1, wherein: said examining means is configured so that said examining means accomplishes said identification by selecting those pixels having an approximate uniform change in intensity.

5. The system as recited in claim 1, wherein: said analysis means is configured so that said analysis means accomplishes said analysis by making use of a neural network.

6. A method for detecting smoke in a monitored area, said method comprising the steps of:
    capturing a series of successive video images of said monitored area with a video capturing device in the form of a series of two-dimensional bitmaps having a specified number of pixels,
    examining said series of bitmaps to identify areas in successive bitmaps of adjacent pixels that have the potential for being used as indicators for the existence of smoke in said monitored area using a computer system,
    chronologically associating said identified areas so as to form clusters that track the growth and movement of each of said identified areas over the duration of their existences using a computer system, and
    analyzing said clusters of identified areas using a computer system, including identifying the presence of a growing smoke cloud in said monitored area if the increase in the size of said identified areas occurs to a greater extent in a top rather than a bottom part of said identified areas.

7. The method as recited in claim 6, further comprising the step of: reducing the quantity of the data used to characterize the increase in size in said identified areas so as to analyze for the presence of smoke in said monitored area by utilizing fewer numerical computations that would have been required had said quantity of data not been reduced.

8. The method as recited in claim 6, wherein said step of analyzing said cluster of identified areas involves making use of a neural network.

9. A system for detecting smoke in a monitored area comprising:
    a video capturing device for capturing a series of successive video images of the monitored area as a series of two-dimensional, pixel bitmaps; and
    a computer system analyzing said series of images using an analysis algorithm and activating a prescribed response system,
    said algorithm includes:
        examining said series of bitmaps to identify indicator areas in successive bitmaps of adjacent pixels that have the potential for being used as indicators for the existence of smoke in said monitored area,
        identifying the trends in the direction of at least one of growth and movement of said indicator areas,
        comparing said identified trends to determine which of said trends are consistent with those produced by the presence of a growing smoke cloud in said monitored area, and
        identifying the presence of a growing smoke cloud in said monitored area if the increase in the size of said indicator areas occurs to a greater extent in a top rather than a bottom part of said indicator areas.

10. The system as recited in claim 8, wherein said analysis algorithm further includes reducing the quantity of data utilized by said algorithm to characterize said identified trends so as to allow said trend comparison step to be performed by utilizing fewer numerical computations than would have been required had said data reduction not been achieved.

* * * * *